US006751419B2

(12) United States Patent
Thomas

(10) Patent No.: US 6,751,419 B2
(45) Date of Patent: *Jun. 15, 2004

(54) BATTERY MODULE TRANSCEIVER FOR EXTENDING THE RANGE OF AN INFRARED REMOTE CONTROLLER

(76) Inventor: Truett S. Thomas, 1612 Hwy. 280 East, DeFuniak Springs, FL (US) 32433

( * ) Notice: Subject to any disclaimer, the term of this patent is extended or adjusted under 35 U.S.C. 154(b) by 184 days.

This patent is subject to a terminal disclaimer.

(21) Appl. No.: 10/114,943

(22) Filed: Apr. 4, 2002

(65) Prior Publication Data

US 2002/0105698 A1 Aug. 8, 2002

Related U.S. Application Data

(63) Continuation of application No. 09/615,180, filed on Jul. 13, 2000.

(60) Provisional application No. 60/143,502, filed on Jul. 13, 1999.

(51) Int. Cl.[7] .......................... H04B 10/00; H04B 10/02

(52) U.S. Cl. ....................... 398/115; 398/128; 398/130; 398/135; 398/138

(58) Field of Search ................................ 398/115, 128, 398/130, 135, 138

(56) References Cited

U.S. PATENT DOCUMENTS 4,532,194 A 7/1985 Liautaud et al. .............. 429/99
D310,367 S 9/1990 Dockery .................... D14/217
5,142,395 A 8/1992 Yamazaki et al. ............ 359/81
5,142,396 A 8/1992 Divjak et al. ............... 359/142
5,142,398 A 8/1992 Heep .......................... 359/148
5,142,399 A 8/1992 Bertrand et al. ............ 359/154
5,142,400 A 8/1992 Solinsky ..................... 359/159
5,268,734 A * 12/1993 Parker et al. .......... 356/139.06
5,677,895 A 10/1997 Mankovitz ................... 368/10
5,917,425 A * 6/1999 Crimmins et al. ..... 340/825.49
5,999,294 A * 12/1999 Petsko ........................ 398/115
6,175,308 B1 1/2001 Tallman et al. ............. 340/539
6,400,480 B1 * 6/2002 Thomas ...................... 398/106

* cited by examiner

*Primary Examiner*—M. R. Sedighian
(74) *Attorney, Agent, or Firm*—Antonelli, Terry, Stout & Kraus, LLP

(57) ABSTRACT

A battery module transceiver for extending the operational range of an infrared remote controller is disclosed. The battery module comprises: a battery power supply received within the battery module transceiver which provides power for the infrared remote controller and a transceiver received within the battery module transceiver. The transceiver has a detector for detecting a radio frequency pulse accompanying a first infrared signal generated from the infrared remote controller and a transmitter for generating a radio frequency signal in response to the radio frequency pulse.

10 Claims, 5 Drawing Sheets

BATTERY MODULE TRANSCEIVER FOR EXTENDING THE RANGE OF AN INFRARED REMOTE CONTROLLER

REFERENCE TO RELATED APPLICATIONS

This is a Continuation of U.S. Ser. No. 09/615,180, filed Jul. 13, 2000, which is incorporated herein by reference in its entirety and which claims priority under 35 U.S.C. 119(e) to U.S. provisional application Ser. No. 60/143,502, entitled "Apparatus for Extending the Range of an Infrared Remote Control," filed on Jul. 13, 1999.

BACKGROUND OF THE INVENTION

1. Field of the Invention

The present invention relates generally to a transceiver in the form factor of battery module for extending the range of operation of existing infrared remote controls.

2. Description of the Related Art

Typical infrared remote controls for devices such as televisions, stereo systems, satellite receivers, VCRs, laser disk players and the like are limited to line of sight operations restricting the location of the user. Furthermore, one or several batteries are installed within the conventional infrared remote controls for providing power to the infrared remote control.

There are several products that detect the infrared (IR) signal and convert it into radio waves. This allows a user to carry the IR remote control to different rooms to operate the device. Some of these products attach to the remote control covering the IR emitter located on the remote control. This blocks the IR signal being emitted from the remote control. Others of these products use a separate transceiver/repeater making it necessary to point the remote control at the repeater and limiting use of the remote control to just the room where the repeater is located and the room where the device being controlled is also located.

SUMMARY OF THE INVENTION

Therefore, it is an objective of the present invention to provide a battery module transceiver for extending the range of operation of existing infrared remote controls.

For obtaining the above-identified objective, the present invention provides a battery module form factor transceiver for extending the operational range of an infrared remote controller, which comprises a battery power supply and a first transceiver. The first transceiver further has a first detector for detecting a radio frequency signal accompanying an infrared signal generated from the infrared remote controller and a transmitter for generating a radio frequency signal in response to the radio frequency pulse.

The size and outward construction of the battery module transceiver is the same as that of the conventional battery so that the battery module transceiver can fit in the battery chamber of the infrared remote controller. Therefore, this allows a user to install the battery module transceiver into the infrared remote controller battery chamber and detect the infrared (IR) signal so as to convert it into radio waves without changing or modifying the exterior structure of the conventional infrared remote controller.

A second device is installed for receiving the above signal made by the remote controller. This device comprises a second transceiver having a second detector for receiving the radio frequency signal, and an infrared emitter for generating an infrared signal in response to the received radio frequency signal to operate the original infrared controlled device, such as TV, satellite receivers, or the like.

BRIEF DESCRIPTION OF DRAWINGS

The above, as well as other advantages of the present invention will become readily apparent to those skilled in the art from the following detailed description of a preferred embodiment when considered in the light of the accompanying drawings in which.

DETAILED DESCRIPTION OF THE INVENTION

Figure 1:
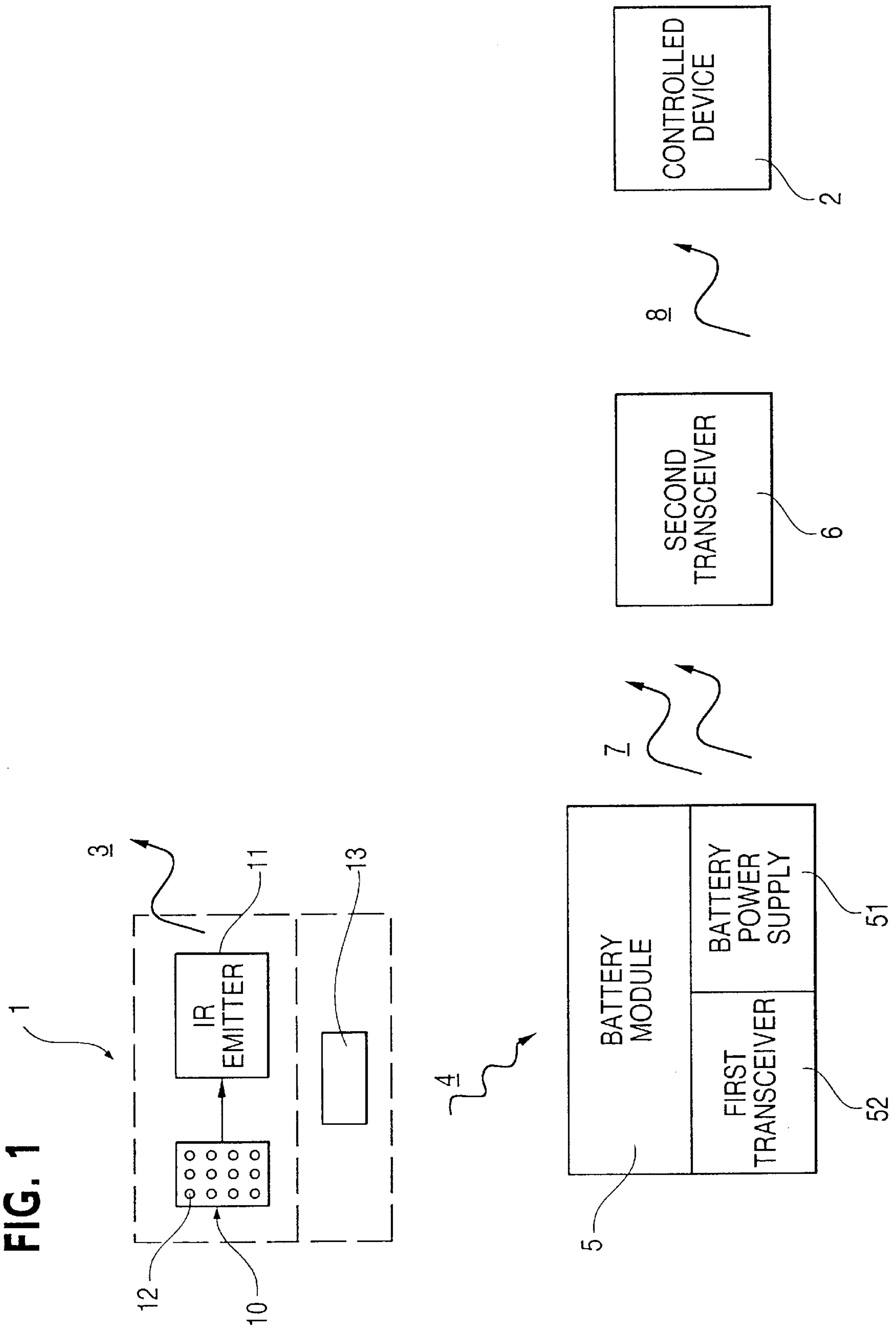
FIG. 1 schematically depicts a block diagram of an extending apparatus in accordance with one preferred embodiments of the present invention.

With reference to FIG. 1, the block diagram of an extending apparatus in accordance with one preferred embodiment of the present invention is schematically illustrated, where an infrared (IR) remote controller 1 and a controlled device 2 is included. The IR remote controller 1 is used to control the operation of the controlled device 2, such as a television, a stereo system, a satellite receiver, a VCR, a laser disk player or the like.

Referring to FIG. 1, the IR remote controller 1 is provided with a keypad 10, an IR emitter 11 and battery chamber 13. The keypad 10 includes one or more buttons 12, when pressed, to actuate the emission of an IR signal 3 from the IR emitter 11. The battery chamber 13 usually contains one or several compartments for receiving several AA-sized or AAA-sized batteries within the infrared remote control 1 to provide power to the same.

The controlled device 2 is sensitive to the IR signal 3 and controlled thereby. However, as well known in the art, the IR remote controller 1 must be within a line of sight of the controlled device 2 to operate it. For overcoming such a restriction, the present invention provides the extending apparatus to extend the operational range of an IR remote control system. As shown in FIG. 1, the apparatus comprises a battery module transceiver 5 having a battery power supply 51 and a first transceiver 52 that is inserted into the battery chamber 13 of the IR remote controller 1, and a second transceiver 6 that is adjacent to the controlled device 2.

It is noted that a radio frequency (RF) signal 4 of about 30~50KC accompanying the emission of the IR signal 3 will be radiated all around the IR remote controller 1 which is representative of the IR signal 3. According to the present invention, the battery module transceiver 5 is used to detect the RF signal 4 irradiated all around the remote controller 1 when it is activated. Upon detection of the RF signal 4 from the IR remote controller 1, the battery module transceiver 5 generates a RF signal 7 which is received by the second transceiver 6. The RF signal 7 is representative of the IR signal 3 emitted from the IR remote controller 1. The second transceiver 6 thereafter converts the received RF signal 4 to an IR signal 8 which corresponds to the IR signal 3 emitted from the IR remote controller 1 and thus controls the operation of the controlled device 2. It should be noted that the frequency range of the radiated RF signal 4 varies with the IR signal 3, but it should not be construed to limit the scope of the present invention.

Figure 2:
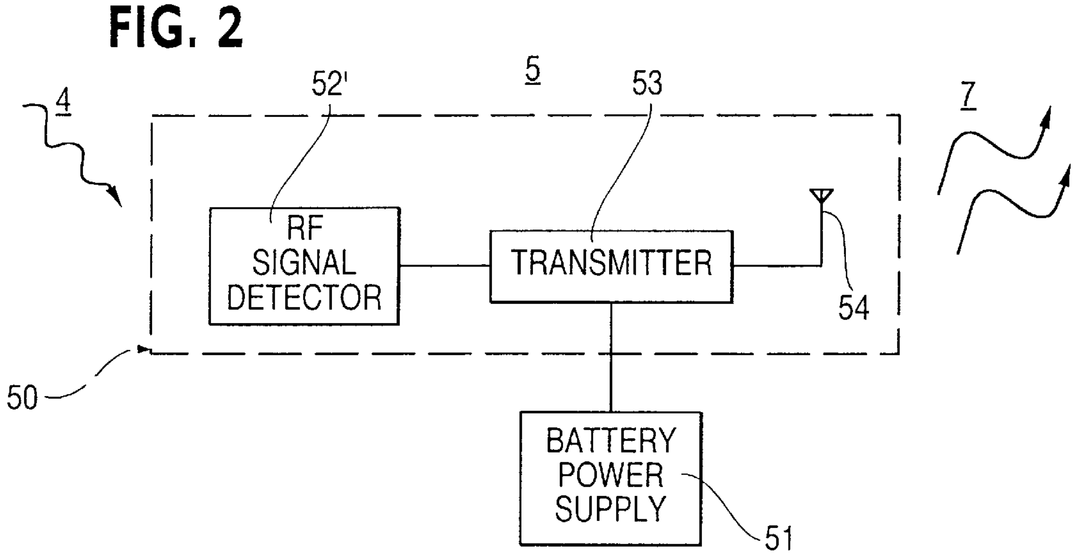
FIG. 2 schematically depicts a detailed block diagram of the battery module transceiver 5 having a first transceiver 50 and a battery power supply 51 of FIG. 1.

Referring to FIG. 2, the detailed block diagram of the battery module transceiver 5 is schematically illustrated. The battery module transceiver 5 comprises a battery power supply 51 and a first transceiver 52. The first transceiver 52 includes, as illustrated in FIG. 2, a RF signal detector 52', a transmitter 53, and a first antenna 54. The RF pulse detector 52' detects the RF signal 4 representative of the IR signal 3 emanating from all around the IR remote controller 1 when it is activated. The RF signal detector 52' is connected to an input of the transmitter 53 powered by the battery power supply 51. An output of the transmitter 53 is connected to the first antenna 54. Upon detection of the RF signal 4 from the IR remote controller 1, the RF signal detector 52' activates the transmitter 53 to generate the RF signal 7 from the first antenna 54. The RF signal 7 representative of the IR signal 3 can be of any suitable signal strength and frequency, modulated or unmodulated, coded or uncoded. For example, the RF signal 7 could be in the UHF range.

Figure 3:
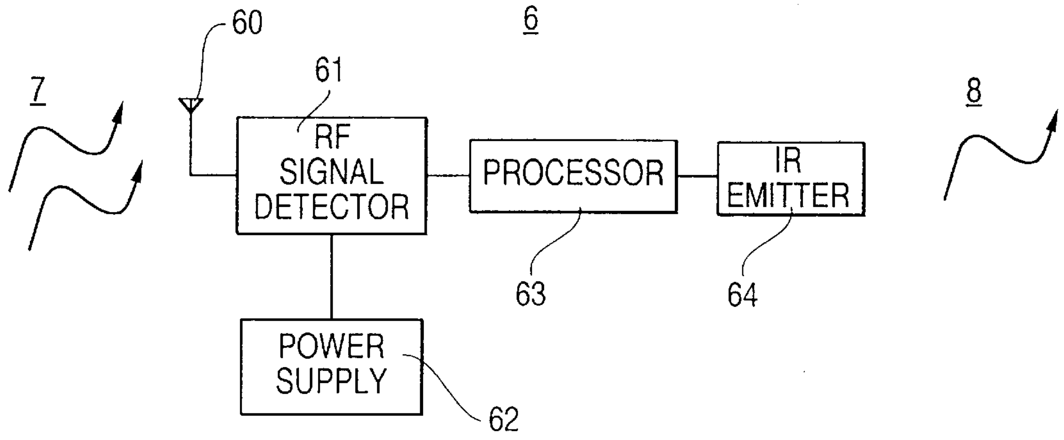
FIG. 3 schematically depicts a detailed block diagram of the second transceiver 6 of FIG. 1.

Referring to FIG. 3, the detailed block diagram of the second transceiver 6 is schematically illustrated. The second transceiver 6 includes a second antenna 60, a RF signal detector 61, a power supply 62, a signal processor 63, and an IR emitter 64. The RF signal 7 is received at the second transceiver 6 by the second antenna 60. The second antenna 60 is connected to an input of the RF signal detector 61 powered by the power supply 62 representing a battery or house current. The RF signal detector 61 is connected to an input of the signal processor 63 that controls the IR emitter 64 for generating the IR signal 8 representative of the IR signal 3 to the controlled device 2. The second transceiver 6 should be placed within a line of sight of the controlled device 2, which is sensitive to the IR signal 8 and controlled thereby. Note that the IR signal 8 corresponds to the IR signal 3 generated from the IR remote controller 1. In an alternative embodiment, the battery module transceiver 5 can be also installed within the second transceiver 6 for generating the corresponding IR signal 8 while the RF signal 7 is received and providing power for the second transceiver 6.

Figure 4:
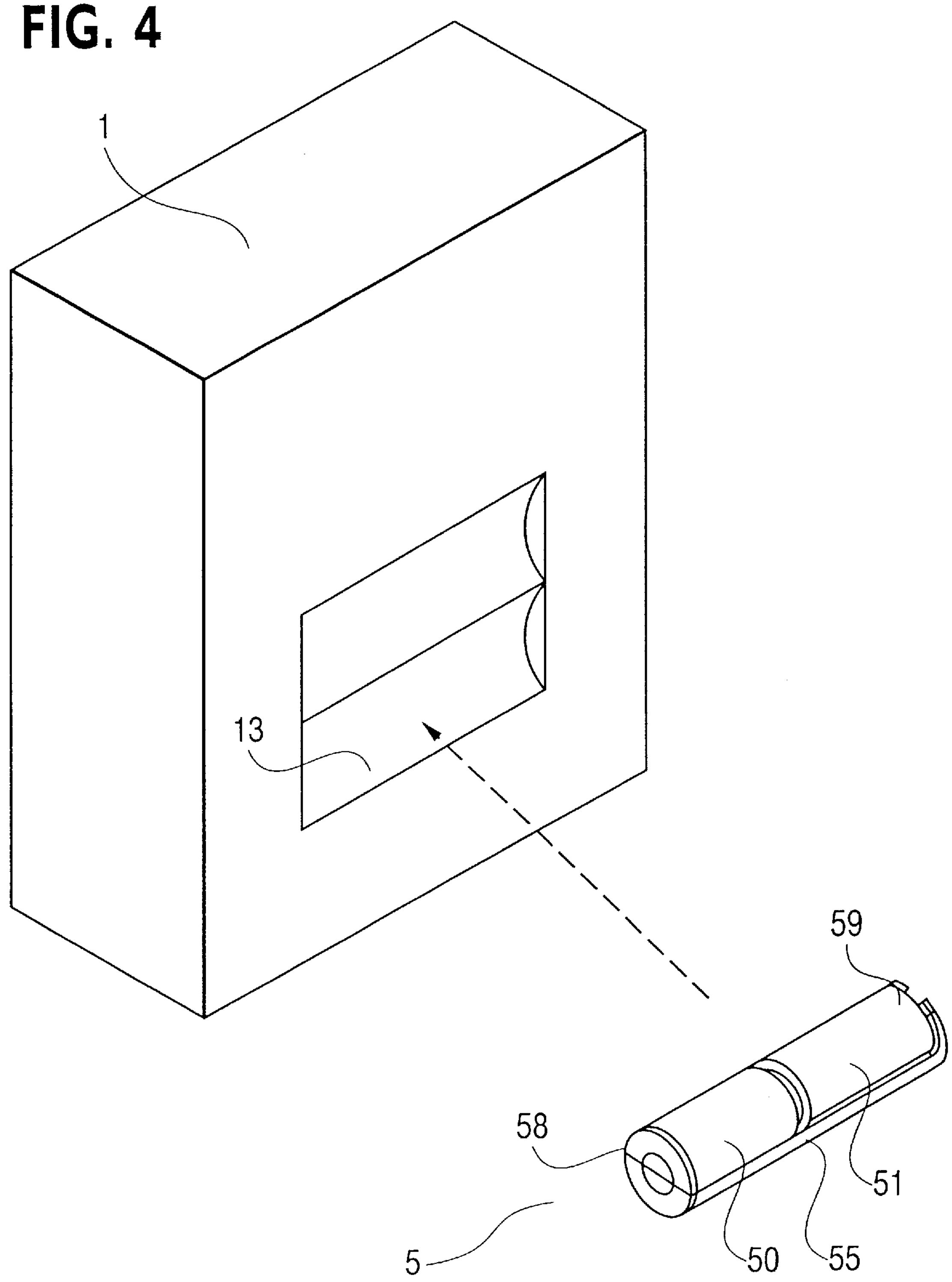
FIG. 4 is a perspective view of an existing infrared remote control and a battery module transceiver 5 in accordance with the present invention.

As shown in FIG. 4, the infrared remote controller 1 comprises one of a plurality of battery chambers 13 for receiving standard batteries, such as AA-sized or AAA-sized battery. The battery module transceiver 5 is comprised of a housing 55 having the first transceiver 51, the battery power supply 51, a negative electrode 58 and a positive electrode 59. It should be noted that the size of the battery module transceiver 5 is the same as that of the battery used in the infrared remote controller 1. Therefore, the battery module transceiver 5 can directly be put into the battery chamber 13 and become part of the battery power supply assembly to provide power to the infrared remote controller 1.

Figure 5:
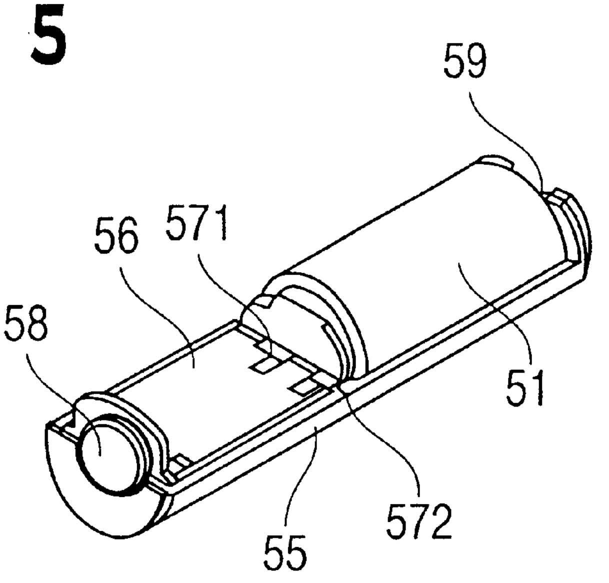
FIG. 5 is a perspective view of the battery module transceiver 5 of FIG. 4 wherein the first transceiver 50 is removed.
Figure 6:
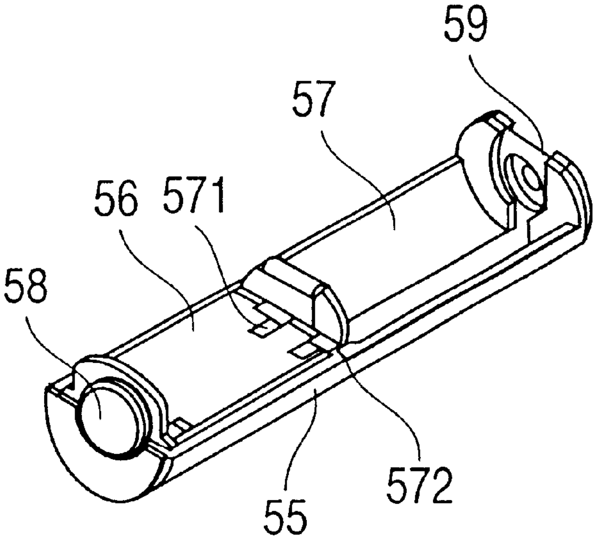
FIG. 6 is a perspective view of the housing 55 of the battery module transceiver 5 in accordance with the present invention; and, FIG. 7 is a perspective view of another example of a battery module transceiver 5 in accordance with the present invention.

Referring to FIGS. 5 and 6, a first compartment 56 and a second compartment 57 is formed in the housing 55. The battery power supply 51 is received within the first compartment 56 and is electrically connected to the negative electrode 58 and the positive electrode 59 respectively. The battery power supply 51, of course, should be chosen to contain a smaller size battery so as to fit in the first compartment 56. Furthermore, extended pads 571 and 572 are formed on the surface of the second compartment 57. When the first transceiver 50 is put into the second compartment 57, the extended pads 571 and 572 are electrically connected to the battery power supply 51 so that it can provide the power for the first transceiver 50 and further for the infrared remote control 1. The first transceiver 50 is received within the second compartment 57 so that it can detect the RF signal 4 and convert the same into radio waves 7.

Figure 7:
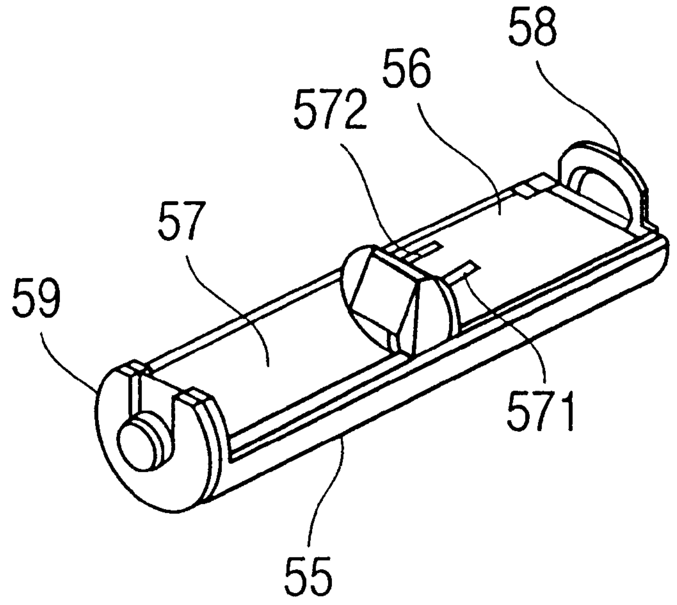

FIG. 7 shows a perspective view of another example of the battery module transceiver 5. The housing of the battery module transceiver 5 has a first compartment 56, a second compartment 57, a positive electrode 59 and a negative electrode 58. As shown in FIG. 7, the battery power supply 51 is received within the second compartment 57 and is electrically connected to the negative electrode 58 and the positive electrode 59 respectively, Furthermore, extended pads 571 and 572 are formed on the surface of the first compartment 56. When the first transceiver 50 is put into the compartment 56, the extended pads 571 and 572 are electrically connected to the battery power supply 51 so that it can provide the power to the first transceiver 50 and further for the infrared remote control 1. The transceiver 50 is received within the first compartment 56 so that it can detect the IR signal and convert the same into radio waves.

In this case, the battery module transceiver 5 which includes the first transceiver 50 is configured as a replacement for at least one battery inside the IR remote controller 1 so as to detect the RF signal 4 more effectively. In another preferred embodiment, the first transceiver 50 can be also integrated into housing 55 so that it is more convenient to use the battery module transceiver. In addition, the user can carry the IR remote controller 1 anywhere in the area to control the device 2. An alternative embodiment for the present invention further comprises an external battery having a voltage more than 1.5 V. The external battery is in conjunction with the battery module transceiver 5 for use in the infrared remote controller 1. Therefore, the external battery can provide power to the infrared remote controller 1 while the battery power 51 provides power to the first transceiver 50. In such case, a longer life of the battery 51 for the transceiver 50 can be obtained.

Therefore, the present invention allows the user to carry the IR remote controller 1 to different rooms and control the device 2. This is unlike other remote extenders that detect the IR signal and convert it to radio waves. To the contrary, the extending apparatus of the present invention detects the 30~50KC pulse 4 when one button 12 is pressed on the IR remote controller 1 and turns these pulses into corresponding radio waves. Therefore, the present invention offers several advantages from those using the IR to UHF conversion methods. For example, the present invention has the advantages of not being affected by ambient light, not covering the existing IR emitter on the remote controller and not using remote control IR detection.

While the invention has been described with reference to various illustrative embodiments, the description is not intended to be construed in a limiting sense. Various modifications of the illustrative embodiments, as well as other embodiments of the invention, will be apparent to those persons skilled in the art upon reference to this description.

It is therefore contemplated that the appended claims will cover any such modifications or embodiments as may fall within the scope of the invention defined by the following claims and their equivalents.

What is claimed is:

1. A device associated with an infrared remote controller which controls a controlled device, comprising:

a transceiver which receives a radio frequency signal accompanying emission of an infrared signal generated by the infrared remote controller during control of the controlled device and which is representative of the infrared signal and in response to receiving the radio signal, transmits a radio frequency signal which is representative of the infrared signal.

2. The device as claimed in claim 1, wherein:

the transceiver comprises an antenna from which the radio frequency signal which is representative of the infrared signal is transmitted.

3. A device associated with an infrared remote controller which controls a controlled device, comprising:

a transceiver which includes means for detecting a radio frequency signal accompanying the emission of an infrared signal generated by the infrared remote controller during control of the controlled device and which is representative of the infrared signal and means for transmitting in response to the radio signal, which transmits a radio frequency signal which is representative of the infrared signal.

4. The device as claimed in claim 3, wherein:

the transceiver comprises an antenna from which the radio frequency signal is transmitted.

5. A method of control of a controlled device with an infrared controller comprising:

providing a first transceiver in association with the infrared controller which receives a radio frequency signal accompanying emission of an infrared signal generated by the infrared remote controller during control of the controlled device and which is representative of the infrared signal and which transmits a radio frequency signal which is representative of the infrared signal;

providing a second transceiver which receives the radio frequency signal transmitted by the first transceiver and in response to the received radio signal transmits an infrared signal which is representative of the infrared signal produced by the infrared controller;

transmitting the infrared signal from the infrared controller;

with the first transceiver receiving the radio frequency signal accompanying the emission of the infrared signal and transmitting the radio frequency signal which is representative of the infrared signal; and with the second transceiver receiving the radio frequency signal transmitted by the first transceiver and transmitting an infrared signal representative of the infrared signal produced by the infrared controller to the controlled device to provide control thereof in accordance with the infrared signal transmitted by the infrared controller.

6. A method in accordance with claim 5 comprising:

providing a battery power supply; and receiving the first transceiver in the battery power supply.

7. A method in accordance with claim 5 wherein:

providing the infrared controller with a housing comprising two compartments and receiving a battery power supply in one of the compartments and receiving the first transceiver in another of the compartments.

8. A system comprising:

a first transceiver, in association with an infrared controller, which detects a radio frequency signal accompanying the emission of an infrared signal generated by the infrared remote controller during control of a controlled device and which is representative of the infrared signal and in response to receiving of the radio frequency signal accompanying the emission of the infrared signal by the remote controller transmits a radio frequency signal which is representative of the infrared signal; and a second transceiver which receives the radio frequency signal transmitted by the first transceiver and in response to receiving the radio frequency signal transmits an infrared signal which is representative of the infrared signal produced by the infrared controller; and wherein the infrared signal is transmitted from the infrared controller;

the first transceiver receives radio frequency signal accompanying the emission of the infrared signal and transmits the radio frequency signal which is representative of the infrared signal; and the second transceiver receives radio frequency signal transmitted by the first transmitter and transmits an infrared signal which is representative of the infrared signal produced by the infrared controller to the controlled device to provide control thereof in accordance with the infrared signal transmitted by the infrared controller.

9. A system in accordance with claim 8 comprising:

a battery power supply which receives the first transducer.

10. A system in accordance with claim 8 wherein:

the infrared controller includes a housing comprising two compartments which receive the battery power supply in one of the compartments and receive the first transceiver in another of the compartments.

* * * * *